7821X
H. Mellish,
Tenoning Machine.
Patented Nov. 19, 1833.
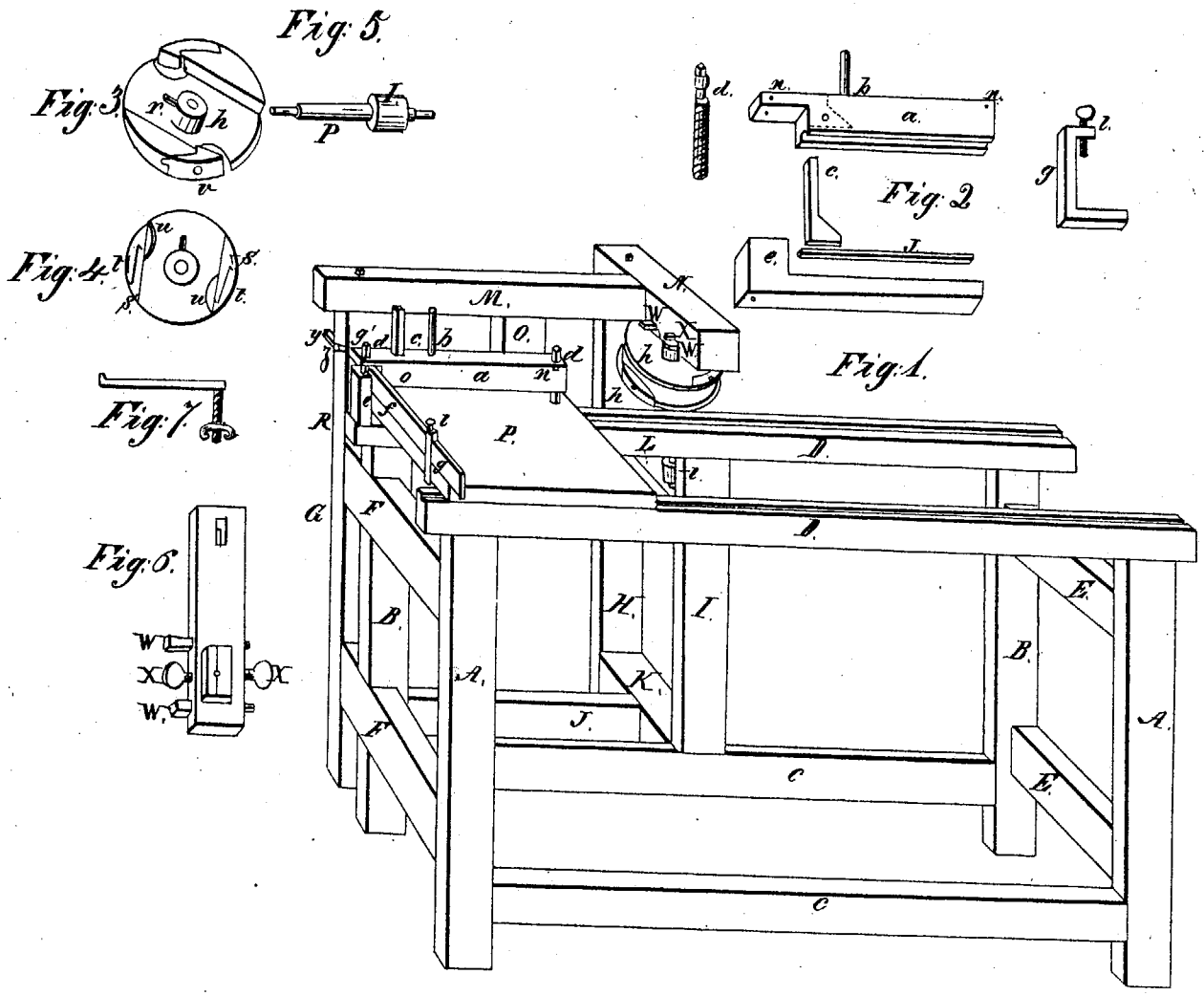
AM. PHOTO-LITHO. CO. N.Y. (OSBORNE'S PROCESS)

X7821 Nov. 19. 1833 111.

Henry Mellish, of Walpole, N.H.
Letters Patent

The schedule referred to in these Letters Patent, and making part of the same, containing a description in the words of the said Henry Mellish himself of his improvement in the Tenoning Machine.

---

To all to whom these presents shall come; Be it known that I, Henry Mellish of Walpole, in the County of Cheshire, and State of New Hampshire, have invented a machine, which is a new and useful improvement in tenoning, and that the following is a full and exact description of the construction and operation of the said machine, as invented by me.
A.A. and B.B, in the drawings which accompany this, are four upright standards or legs, to which the pieces C.C. D.D. E.E. and F.F. are connected by mortises and tenons excepting F.F. and the standard B. which are locked together. The length of the frame may be three feet and a half by two and a half wide, the height three feet; the pieces F.F. extending beyond the standard B. to the standard G. which is seven inches from B. H. is an upright standard one foot from the prop, I. and is connected to the rail C. by the girt K, and to the prop I. by the girt L. above it; J. is a girt or rail running from K. to the standard G. R is a corresponding girt or rail (which cannot be seen in the drawings) running from the girt L, to the standard G. M. N. are framed together at right angles, and from the cap piece, which is framed to standards G.H. and the prop. O. and is made fast by screws the prop. O. is supported by the girt R. P. is the bed piece of the carriage, made of plank, having two grooves across the underside to correspond with grooves in the rails D.D, into these grooves pieces are made fast which fill the grooves in the rails D.D, and serve to guide the carriage. c, is a piece of wood made fast with screws across the bottom of the carriage (see c. Fig. II.) gg. are two pieces of iron bent at right angles, with a thumb screw I. at the upper end (see g Fig. II,) which irons are made fast in the bottom of the bed piece with screws, one piece near each end; r. is a piece of board placed against the irons gg. and made fast to the bed piece by the screws t.g. – a. is a piece of wood (shape represented by a. in Fig. II,) with a hole at each end to receive the screws d.d, which pass down into e. and the bed of the carriage; these screws have a neck near the upper end (see d. Fig. II) so that by passing stay pins through the holes n.n, against the necks of the screws, the stick may be raised or lowered by turning the screws – –

Through a, a mortice is cut to receive the lever c, (see the shapes of the mortice at c, and the lever c in fig. II) which is confined in the mortise by a pin through at c, on which it turns. a. has a groove from end to end in the under side, to receive the piece J. which fits loosely in and is drawn to the bottom of the groove by the spiral spring J, (see fig. II; (also the groove and the piece to be placed in it.) this spring is let into the piece a, at the bottom of the groove, one end running through and made fast at the upper surface; the other end being made fast to the piece J. b. is a pin made fast in the piece a. h.h. are two circular cast iron plates; at the periphery of each plate, two chisels are attached, opposite to each other, by a screw passing through each chisel into wings projecting from one side for that purpose; (see Fig. III.v. also the shape of the wings or projections at s.s. Fig. IV, and an edge view of the chisels at u. Fig. IV.). Each of these plates has a round hole through the centre; from one side of the plate encircling the hole a tube extends (see fig. III at h.) a sufficient distance to receive the screw r. Fig. III.. There are mouths or openings in these plates at the points of the chisels, running back with a sufficient slant inside of the wings to let the chips pass off without clogging (see n.n. Fig IV.). P, is a perpendicular shaft of iron or steel (see fig. V.) the lower end of which is placed into a hole in the girt s, and rests in the end of a screw that turns into the hole from the under side of the girt by turning this screw the shaft and plates may be raised or lowered: the upper end of the shaft is placed in a box in the under side of the cap piece N. see fig. VI, where w. w. are wedges passing through the cap piece against the ends of the box: x. x. are two screws running in from the opposite sides of the piece N. against the sides of the box; by means of which wedges and screws, the shaft may be placed, and kept in a perpendicular direction. The plates are placed on the shaft in the following manner. 1st place the plate fig. III. on to the shaft, the tube against the pulley i,

X7821

Fig. V. and make it fast, by turning the screw x, then put on the other Fig. IV. the tube in the opposite direction and make it fast by turning the screw. y. is a square stick or gauge with a scale of inches on it which passes through a mortise in the standard G, just above the level of the top of the carriage, and may be confined at any spot in the mortise, by the screw z. which turns into the standard against it. In the upper surface of the carriage against the piece E, a groove is made from the piece e, to the side of the carriage and along the centre of this groove, through the bed piece of the carriage, a narrow opening is made from the piece e, to the iron g. Fig. VII, is a gauge, which is a thin piece of iron or steel, with one end bent at a right angle: at the other end a screw is made fast, running in an opposite direction to the end bent up, this screw having a thumb nut to fit the lower end; this gauge is placed into the groove in the carriage, the screw through the opening, and the thumb nut on the end of the screw, at the lower side of the carriage; so that by placing the hook of the gauge, by a scale of inches, along the side of groove in the bed piece and fastening it by turning the nut, under the carriage, the distance between the tenons may be gauged — —

The operation of the machine is as follows; Water, steam, horse, or hand power is applied to some wheel or cylinder unconnected with the machine, from which a band is passed over the pulley i. which puts the plates and chisels in motion; the upper edge of the lower plate being placed as much higher than the upper surface of the carriage, as is required for the depth of the shoulder on the piece to be tenoned, and the plates such distance apart as is required for the thickness of the tenon; then the gauge y, is to be set by the scale according to the required length of the tenon, next lay the piece to tenon on to the carriage: under the piece a, and against the piece E, and the end against the gauge y; then by clenching the lever c. and the pin h, with one hand, the lever will be forced towards the pin, and the piece J, in the groove will be forced down on to the piece on the carriage, which will keep it fast in its place, the carriage is then to be shoved along in the groove till the piece on the carriage comes in contact with the plates and chisels, the chisels cutting away the wood on each side of the stick, as it passes along and the tenon passing through between the plates. Then by loosening the hold

714. X 7821 of the lever and pin, the piece may be taken out, turned end for end, and placed on the carriage as before, bringing the shoulder just made against the gauge in the carriage which having been previously set for the purpose will give the required length, between the shoulders, when it has been run through as before described. — —

Witnesses
Henry Hubbard
Laura E. Lovell

Henry Mellish (Dr in port folio)

Exd.
H.G.

[illegible]